United States Patent
Yang et al.

(10) Patent No.: US 11,032,587 B2
(45) Date of Patent: *Jun. 8, 2021

(54) SYSTEMS AND METHODS OF VIDEO FORWARDING WITH ADAPTIVE VIDEO TRANSCODING CAPABILITIES

(71) Applicant: Dialogic Corporation, Montreal (CA)

(72) Inventors: Kyeong Ho Yang, Freehold, NJ (US); Antony R. Martin, Westfield, NJ (US)

(73) Assignee: Dialogic Corporation, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/272,184

(22) Filed: Feb. 11, 2019

(65) Prior Publication Data

US 2019/0200049 A1    Jun. 27, 2019

Related U.S. Application Data

(63) Continuation of application No. 15/851,990, filed on Dec. 22, 2017, now Pat. No. 10,250,921.

(51) Int. Cl.
*H04N 21/234* (2011.01)
*H04N 21/2343* (2011.01)
(Continued)

(52) U.S. Cl.
CPC ......... *H04N 21/2343* (2013.01); *H04N 7/152* (2013.01); *H04N 21/2187* (2013.01);
(Continued)

(58) Field of Classification Search
CPC ........... H04N 21/2343; H04N 21/2402; H04N 21/2543; H04N 21/2662; H04N 21/6437;
(Continued)

(56) References Cited

U.S. PATENT DOCUMENTS

| 9,843,606 B1* | 12/2017 | Vendrow ................. H04L 41/08 |
| 2002/0136298 A1* | 9/2002 | Anantharamu .... H04N 21/2402 |
| | | 375/240.12 |

(Continued)

OTHER PUBLICATIONS

ITU-T, "Recommendation ITU-T H.264," Telecommunication Standardization Sector of ITU, 812 pages, Apr. 2017.

(Continued)

*Primary Examiner* — Nicholas T Corbo
(74) *Attorney, Agent, or Firm* — Adam R. Stephenson, LTD.

(57) ABSTRACT

Techniques for providing selective video forwarding in real-time video applications involving multiple user devices. The techniques can be employed in WebRTC videoconferences, taking into account the heterogeneous natures of device display resolutions and networks in which the respective devices operate. The techniques employ a selective forwarding unit (SFU) having a real-time adaptive video transcoder. The SFU determines whether a benefit to quality of experience (QoE) can be achieved by performing, in real-time, adaptive video transcoding on large video streams produced by the respective devices. If a heterogeneity value associated with available network bandwidths is greater than a predetermined value and sufficient CPU/memory resources are available, then the real-time adaptive video transcoder performs, in real-time, adaptive video transcoding on the large video streams to produce corresponding small video streams, which are selectively forwarded to user devices having low available network bandwidths.

17 Claims, 4 Drawing Sheets

(51) Int. Cl.
| | |
|---|---|
| *H04N 21/24* | (2011.01) |
| *H04N 21/2543* | (2011.01) |
| *H04N 21/2662* | (2011.01) |
| *H04N 21/6437* | (2011.01) |
| *H04N 7/15* | (2006.01) |
| *H04N 21/2187* | (2011.01) |

(52) U.S. Cl.
CPC ..... *H04N 21/2402* (2013.01); *H04N 21/2543* (2013.01); *H04N 21/2662* (2013.01); *H04N 21/6437* (2013.01)

(58) Field of Classification Search
CPC .......... H04N 7/15; H04N 7/152; H04N 7/155; H04L 12/18
See application file for complete search history.

(56) References Cited

U.S. PATENT DOCUMENTS

| | | | | |
|---|---|---|---|---|
| 2014/0089469 | A1* | 3/2014 | Ramamurthy | H04L 65/60 709/219 |
| 2014/0313281 | A1* | 10/2014 | Graff | H04L 65/80 348/14.09 |
| 2018/0359500 | A1* | 12/2018 | Hasek | H04N 21/2402 |

OTHER PUBLICATIONS

Westin et al., "RTP Payload Format for VP8 Video", Payload Working Group, IETF Trust, Oct. 2013, 30 pages.
ITU-T, Recommendation H.265 (Apr. 2013), Series H: Audiovisual and Multimedia Systems, Infrastructure of audiovisual services—Coding of Moving Video, High Efficiency Video Coding, Oct. 2014, 540 pages.
Sullivan et al., "Overview of the High Efficiency Video Coding (HEVC) Standard", IEEE Transactions on Circuits and Systems for Video Technology, vol. 22, No. 12, Dec. 2012, p. 1649-1668.
"VP9 Video Codec", The WebM Project, Mar. 27, 2017, <<http://www.webmproject.org/vp9>> Article accessed Mar. 21, 2018, 4 pages.
WebRTC, 2017, <<http://www.webrtc.org/>> Article accessed Mar. 21, 2018, 4 pages.
Perkins et al., "Web Real-Time Communication (WebRTC): Media Transport and Use of RTP," RTCWeb Working Group, Standards Track, Jun. 2015, 45 pages.
B. Aboba, "Codec-Independent Selective Forwarding," AVTCORE Working Group, Informational, Jul. 6, 2015, 15 pages.
Grozev et al., "Last N: Relevance-Based Selectivity for Forwarding vVdeo in Multimedia Conferences," Proceedings of the 25th ACM Workshop on Network and Operating Systems Support for Digital Audio and Video, Mar. 2015, pp. 19-24.
Lennox et al., "Sending Multiple Media Streams in a Single RTP Session," Standards Track, AVTCORE, IETF Trust, Dec. 11, 2015, 27 pages.
Westerlund et al., "Using Simulcast in RTP Sessions," Network Working Group, IETF Trust, Jul. 4, 2014, 23 pages.
Schulzrinne et al, "RTP: A Transport Protocol for Real-Time Applications", Network Working Group, IETF Trust, Standards Track, Jul. 2003, 89 pages.
H. Alvestrand, "RTCP Message for Receiver Estimated Maximum Bitrate", Network Working Group, IETF Trust, Oct. 21, 2013, 8 pages.
Ott et al., "Extended RTP Profile for Real-Time Transport Control Protocol (RTCP)—Based Feedback (RTP/AVPF)", Network Working Group, Standards Track, Jul. 2006, 51 pages.
Johansson et al., "Support for Reduced-Size Real-Time Transport Control Protocol (RTCP): Opportunities and Consequences", Network Working Group, IETF Trust, Standards Track, Apr. 2009, 17 pages.
Wenger et al., "Codec Control Messages in the RTP Audio-Visual Profile with Feedback (AVPF)", Network Working Group, IETF Trust, Standards Track, Feb. 2008, 64 pages.
"PowerMedia XMS—Product Presentation", Dialogic, Dialogic Corporation, Aug. 2017, 5 pages.

* cited by examiner

SYSTEMS AND METHODS OF VIDEO FORWARDING WITH ADAPTIVE VIDEO TRANSCODING CAPABILITIES

CROSS-REFERENCE TO RELATED APPLICATIONS

This application is a continuation of U.S. patent application Ser. No. 15/851,990 filed Dec. 22, 2017 entitled SYSTEMS AND METHODS OF VIDEO FORWARDING WITH ADAPTIVE VIDEO TRANSCODING CAPABILITIES.

BACKGROUND

Video communications have become increasingly popular as a result of widespread deployment of broadband networks, advancements in video compression technologies, and increased availability of low-cost tools for implementing web-based video communications. One such tool is the web real-time communication (WebRTC) standard, which is a set of protocols and application programming interfaces (APIs) defined by the World Wide Web Consortium (W3C) and the Internet Engineering Task Force (IETF). The WebRTC standard generally supports browser-to-browser applications such as voice calling, video chat, and peer-to-peer (P2P) file sharing applications, while avoiding the need for plugins to connect video communications endpoints.

In recent years, the WebRTC standard has been employed in real-time video applications, such as multi-party video conferencing applications. The selective forwarding unit (SFU) model has also been employed to provide a low-cost solution to deployment of multi-party WebRTC videoconferences. In the SFU model, multiple participant devices in a WebRTC videoconference typically send one or more video streams including real-time transport protocol (RTP) video packets to a central server, which generally functions as a packet data router. The central server receives the video streams from the respective participant devices, and selectively forwards (or routes) a plurality of video streams to each participant device. The participant devices can also send simultaneous broadcast (or simulcast) video streams including at least a high quality video stream and a low quality video stream to the central server, which selectively forwards (or routes) the high quality video stream and/or the low quality video steam to a respective participant device based on one or more factors such as system load, network bandwidth, available bit rate, etc.

The increased use of mobile devices such as smartphones and tablet computers has posed particular challenges to multi-party video communications, due primarily to the heterogeneous natures of the display resolutions of mobile devices and/or the communications networks in which such mobile devices operate. For example, some mobile devices with displays having reduced resolutions may require good quality, small video streams (e.g., video streams with frame sizes of 360p) to obtain an optimal quality of experience (QoE) for viewing video, while other mobile devices with displays having increased resolutions may require high quality, large video streams (e.g., video streams with frame sizes of 720p or 1080p) to obtain such an optimal QoE. Further, some mobile devices may operate in communications networks with reduced available bandwidths (e.g., available bandwidths of 500 kbits/sec), while other mobile devices may operate in communications networks with increased available bandwidths (e.g., available bandwidths of 1 Mbits/sec).

However, a central server hosting a videoconference (such as a WebRTC videoconference) based on the SFU model is typically incapable of providing all participant devices with video streams that completely satisfy the display criteria (e.g., display resolution, available network bandwidth) of the respective participant devices. In some cases, the central server may request one or more of the participant devices to reduce a video encoding bitrate in accordance with the display criteria of a participant device having the lowest available network bandwidth, resulting in a lower QoE for other participant devices that may be capable of handling higher video encoding bitrates. In other cases, the central server may stop sending video streams to the participant device having the lowest available network bandwidth, enabling it to provide high quality, large video streams to other participant devices that may have higher available network bandwidths. Each case, however, typically results in suboptimal QoE for some of the devices participating in the videoconference.

SUMMARY

Improved systems, methods, and techniques are disclosed herein for providing video forwarding in real-time video applications involving multiple user devices. The disclosed techniques can be employed in WebRTC videoconferences based on the SFU model, taking into account the heterogeneous natures of the display resolutions of participant devices and/or the communications networks in which such participant devices operate. The disclosed techniques can be implemented using a media server that includes a selective forwarding unit (SFU) having a real-time adaptive video transcoder. The media server can determine whether a benefit to the general QoE of the participant devices can be achieved by performing, in real-time, adaptive video transcoding on large video streams produced by at least some of the respective devices.

To that end, the media server can determine a heterogeneity value associated with the available network bandwidths of the respective devices, and a current availability of central processing unit (CPU) and/or memory resources within the media server. If the heterogeneity value of the available network bandwidths is greater than a predetermined value (such as zero (0) or any other suitable value) and the CPU and/or memory resources are available, then the real-time adaptive video transcoder can beneficially perform, in real-time, adaptive video transcoding on at least some of the large video streams to produce corresponding small video streams, which can be selectively forwarded by the media server to one or more participant devices having low available network bandwidths. By providing a media server that includes an SFU with a real-time adaptive video transcoder that can perform, in real-time, adaptive video transcoding of large video streams based on the heterogeneity of available network bandwidths and/or the current availability of CPU and/or memory resources, improvements in the QoE of participant devices in a real-time video application can be beneficially achieved.

In certain aspects, an SFU includes a real-time adaptive video transcoder, a memory storing one or more sets of instructions, and at least one processor configured to execute the one or more sets of instructions (i) to receive a plurality of video streams from a plurality of user devices, respectively, one or more of the plurality of video streams corresponding to one or more large video streams, (ii) to determine an available bandwidth to each of the plurality of user devices, (iii) to identify one or more user devices among the plurality of user devices as being associated with a low available bandwidth, (iv) to cause the real-time adaptive video transcoder to perform, in real-time, adaptive video transcoding on a large video stream among the one or more large video streams to produce a corresponding small video stream that conforms to the low available bandwidth, and (v) to selectively forward at least the corresponding small video stream to the one or more user devices associated with the low available bandwidth.

In certain further aspects, a method of providing real-time adaptive video transcoding in an SFU includes receiving a plurality of video streams from a plurality of user devices, respectively, in which one or more of the plurality of video streams corresponds to one or more large video streams. The method further includes determining an available bandwidth to each of the plurality of user devices, identifying one or more user devices among the plurality of user devices as being associated with a low available bandwidth, and performing, in real-time, adaptive video transcoding on a large video stream among the one or more large video streams to produce a corresponding small video stream that conforms to the low available bandwidth. The method still further includes selectively forwarding at least the corresponding small video stream to the one or more user devices associated with the low available bandwidth.

In certain further aspects, an SFU includes a real-time adaptive video transcoder, a memory storing one or more sets of instructions, and at least one processor configured to execute the one or more sets of instructions (i) to receive a plurality of video streams from a plurality of user devices, respectively, one or more video streams among the plurality of video streams having a large frame format, (ii) to obtain a display resolution of each of the plurality of user devices, (iii) to identify one or more user devices among the plurality of user devices as having a low display resolution, (iv) to cause the real-time adaptive video transcoder to perform, in real-time, frame resolution adaptation on a respective video stream among the one or more video streams having the large frame format to transform the respective video stream to a corresponding video stream having a reduced frame format that conforms to the low display resolution, and (v) to selectively forward at least the corresponding video stream having the reduced frame format to the one or more user devices having the low display resolution.

In certain further aspects, a method of providing real-time adaptive video transcoding in an SFU includes receiving a plurality of video streams from a plurality of user devices, respectively, in which one or more video streams among the plurality of video streams has a large frame format. The method further includes obtaining a display resolution of each of the plurality of user devices, identifying one or more user devices among the plurality of user devices as having a low display resolution, and performing, in real-time, frame resolution adaptation on a respective video stream among the one or more video streams having the large frame format to transform the respective video stream to a corresponding video stream having a reduced frame format that conforms to the low display resolution. The method still further includes selectively forwarding at least the corresponding video stream having the reduced frame format to the one or more user devices having the low display resolution.

Other features, functions, and aspects of the invention will be evident from the Detailed Description that follows.

BRIEF DESCRIPTION OF THE DRAWINGS

The foregoing and other objects, features, and advantages will be apparent from the following description of particular embodiments of the invention, as illustrated in the accompanying drawings in which like reference characters refer to the same parts throughout the different views.

DETAILED DESCRIPTION

U.S. patent application Ser. No. 15/851,990 filed Dec. 22, 2017 entitled SYSTEMS AND METHODS OF VIDEO FORWARDING WITH ADAPTIVE VIDEO TRANSCODING CAPABILITIES is hereby incorporated herein by reference in its entirety.

Improved systems, methods, and techniques are disclosed herein for providing video forwarding in real-time video applications involving multiple user devices. The disclosed techniques can be employed in web real-time communication (WebRTC) videoconferences based on the selective forwarding unit (SFU) model, taking into account the heterogeneous natures of the display resolutions of participant devices, as well as the communications networks in which the participant devices operate. The disclosed techniques can be implemented using a media server computer (also referred to herein as the "media server") that includes an SFU having an adaptive video transcoder. The media server can determine whether a benefit to the general quality of experience (QoE) of the participant devices can be achieved by performing video transcoding on large video streams produced by at least some of the respective devices.

If a heterogeneity value associated with available network bandwidths is greater than a predetermined value (such as zero (0) or any other suitable value) and central processing unit (CPU) and/or memory resources are available, then the adaptive video transcoder can beneficially perform video transcoding on at least some large video streams to produce corresponding small video streams, which can be selectively forwarded to one or more of the participant devices having low available network bandwidths. Such small video streams can be produced using a reduced frame size (e.g., 360p or any other suitable frame size) and/or a lower bitrate (e.g., 500 kbits/sec or any other suitable bitrate) compared with the frame size (e.g., 720p, 1080p, or any other suitable frame size) and/or the bitrate (e.g., 1 Mbits/sec or any other suitable bitrate), respectively, of the large video streams. By providing an SFU with an adaptive video transcoder that can perform video transcoding of large video streams based on the heterogeneity of available network bandwidths and the current availability of CPU and/or memory resources, improvements in the QoE of participant devices in a real-time video application can be beneficially achieved.

Figure 1:
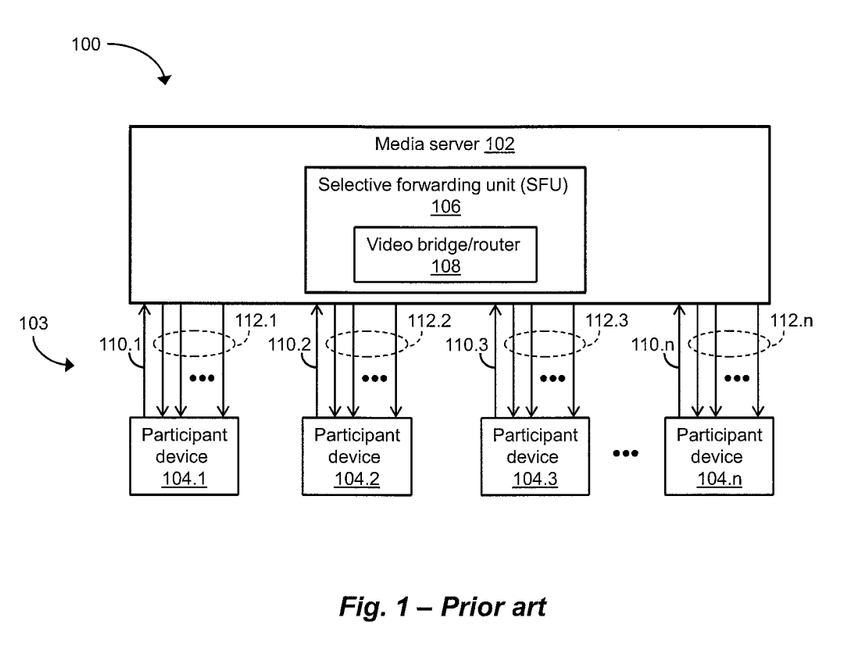
FIG. 1 is a block diagram of a conventional exemplary system for providing video forwarding in real-time video applications involving multiple user devices, including a media server having a selective forwarding unit (SFU)

FIG. 1 depicts an illustrative embodiment of a conventional exemplary system 100 for providing video forwarding in real-time video applications, including a media server 102 and a plurality of user (or participant) devices 104.1, 104.2, 104.3, . . . , 104.n, which are communicably coupled to the media server 102 by a communications medium 103 such as one or more wired/wireless communications networks, paths, or links. For example, such real-time video applications may include a videoconference application, a video chat application, or any other suitable real-time video application. In one embodiment, the WebRTC standard may be employed to implement a multi-party video conferencing application within the system 100. The WebRTC standard is a set of protocols and application programming interfaces (APIs) defined by the World Wide Web Consortium (W3C) and the Internet Engineering Task Force (IETF) that support browser-to-browser applications such as voice calling, video chat, and peer-to-peer (P2P) file sharing applications, while avoiding the need for plugins to connect video communications endpoints.

The selective forwarding unit (SFU) model may be employed to provide a low-cost solution to deployment of a multi-party WebRTC videoconference. To that end, the media server 102 of FIG. 1 can include an SFU 106, which can have a video bridge/router 108. In the SFU model of FIG. 1, the plurality of participant devices 104.1, . . . , 104.n can each send, to the media server 102, one or more video streams including real-time transport protocol (RTP) video packets. For example, the participant device 104.1 may send a video stream to the media server 102 over a communications path 110.1. Likewise, the participant devices 104.2, 104.3, . . . , 104.n may send respective video streams to the media server 102 over communications paths 110.2, 110.3, . . . , 110.n, respectively. The media server 102 can function as a packet data router, receiving, at the video bridge/router 108 of the SFU 106, the video streams from the respective devices 104.1, . . . , 104.n, and selectively forwarding (or routing), via the video bridge/router 108 of the SFU 106, a plurality of video streams to each participant device 104.1, . . . , 104.n. For example, the SFU 106 may selectively forward (or route) (i) a plurality of video streams 112.1 (including the video streams 110.2, 110.3, . . . , 110.n) to the participant device 104.1, (ii) a plurality of video streams 112.2 (including the video streams 110.1, 110.3, . . . , 110.n) to the participant device 104.2, (iii) a plurality of video streams 112.3 (including the video streams 110.1, 110.2, 110.4, . . . , 110.n) to the participant device 104.3, and so on, up to a plurality of video streams 112.n (including the video streams 110.1, 110.2, . . . , 110.n−1) to the participant device 104.n.

The system 100 for providing video forwarding in real-time video applications has deficiencies, however, in that the media server 102 may be incapable of providing all of the participant devices 104.1, . . . , 104.n with video streams that completely satisfy the display criteria (e.g., display resolution, available network bandwidth) of the respective devices 104.1, . . . , 104.n. In some cases, the media server 102 may request all of the participant devices 104.1, 104.2, 104.3, . . . , 104.n to reduce a video encoding bitrate for all of the incoming video streams 110.1, 110.2, 110.3, . . . , 110.n in accordance with the display criteria of one of the participant devices 104.1, 104.2, 104.3, . . . , 104.n having the lowest available network bandwidth, resulting in a low QoE for the other participant devices that may capable of handling higher video encoding bitrates. In other cases, the media server 102 may stop sending video streams to the respective device having the lowest available network bandwidth, enabling the media server 102 to provide high quality, large video streams to the other participant devices that may have higher available network bandwidths. In each case, however, suboptimal QoE typically results for some of the devices 104.1, . . . , 104.n participating in a real-time video application.

Figure 2A:
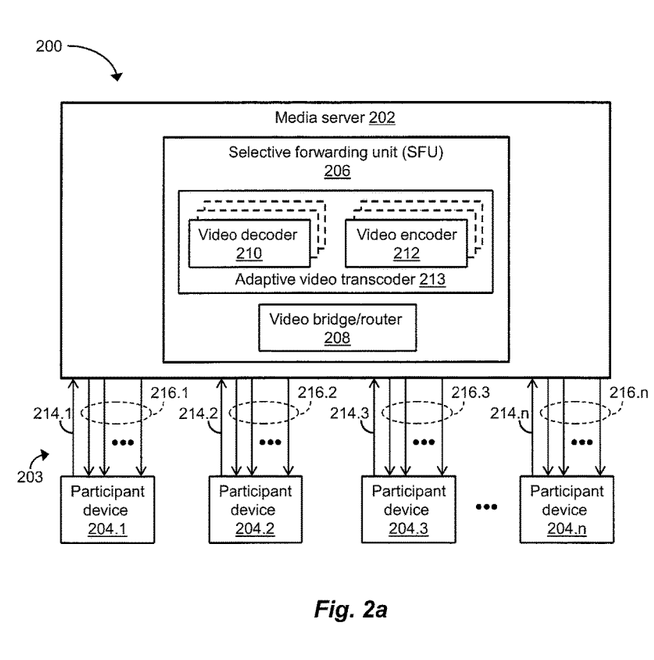
FIG. 2a is a block diagram of an exemplary system for providing video forwarding in real-time video applications involving multiple user devices, including a media server having an SFU with an adaptive video transcoder.

FIG. 2a depicts an illustrative embodiment of an exemplary system 200 for providing video forwarding in real-time video applications, including a media server 202 and a plurality of user (or participant) devices 204.1, 204.2, 204.3, . . . , 204.n, which are communicably coupled to the media server 202 by a communications medium 203 such as one or more wired/wireless communications networks (e.g., local area network (LAN), wide area network (WAN), the Internet), paths, or links. The participant devices 204.1, . . . , 204.n can be implemented using any suitable multimedia communications client computers and/or server computers. Like the media server 102 (see FIG. 1), techniques implemented by the media server 202 can be employed in WebRTC videoconferences based on the SFU model, but taking into account the heterogeneous natures of (i) the display resolutions of the respective devices 204.1, 204.2, 204.3, . . . , 204.n, (ii) the communications networks in which the participant devices 204.1, . . . , 204.n operate, and (iii) the communications paths or links that the participant devices 204.1, . . . , 204.n employ to communicate across the networks. In the SFU model of FIG. 2a, the plurality of participant devices 204.1, . . . , 204.n can each send, to the media server 202, one or more digital video streams including RTP video packets. For example, the participant device 204.1 may send a video stream to the media server 202 over a communications path 214.1. Likewise, the participant devices 204.2, 204.3, . . . , 204.n may send respective video streams to the media server 202 over communications paths 214.2, 214.3, . . . , 214.n, respectively. The media server 202 can function as a packet data router, receiving, at a video bridge/router 208 of the SFU 206, the video streams from the respective devices 204.1, . . . , 204.n, and selectively forwarding (or routing), via the video bridge/router 208 of the SFU 206, a plurality of digital video streams to each participant device 204.1, . . . , 204.n. For example, the SFU 206 may selectively forward (or route) (i) a plurality of video streams 216.1 (including representations of the video streams 214.2, 214.3, . . . , 214.n) to the participant device 204.1, (ii) a plurality of video streams 216.2 (including representations of the video streams 214.1, 214.3, . . . , 214.n) to the participant device 204.2, (iii) a plurality of video streams 216.3 (including representations of the video streams 214.1, 214.2, 214.4, . . . , 214.n) to the participant device 204.3, and so on, up to a plurality of video streams 216.n (including representations of the video streams 214.1, 214.2, . . . , 214.n−1) to the participant device 204.n.

As shown in FIG. 2a, the SFU 206 includes an adaptive video transcoder 213, which can have one or more video decoders 210 and one or more video encoders 212. The media server 202 can determine whether a benefit to the general QoE of the respective devices 204.1, 204.2, 204.3, . . . , 204.n can be achieved by performing video transcoding on high quality, large video streams (e.g., video streams with high bitrates such as 1 Mbits/sec and/or large frame sizes such as 720p or 1080p) produced by at least some of the respective devices 204.1, . . . , 204.n. To that end, the media server 202 can determine a heterogeneity value associated with the available network bandwidths of the respective devices 204.1, . . . , 204.n, and a current availability of CPU and/or memory resources within the media server 202. If the heterogeneity value of the available network bandwidths is greater than a predetermined value (such as zero (0) or any other suitable value) and the CPU and/or memory resources are available, then the adaptive video transcoder 213 can beneficially perform video transcoding on at least some of the high quality, large video streams to produce corresponding low quality, small video streams (e.g., video streams with reduced bitrates such as 500 kbits/sec and/or reduced frame sizes such as 360p), which can be selectively forwarded by the media server 202 to one or more of the participant devices 204.1, . . . , 204.n having low available network bandwidths. By providing the media server 202 including the SFU 206 with the adaptive video transcoder 213, which can perform video transcoding of large video streams based on the heterogeneity of available network bandwidths and the current availability of CPU and/or memory resources, improvements in the QoE of participant devices in real-time video applications (such as a WebRTC videoconference) can be beneficially achieved.

Figure 2B:
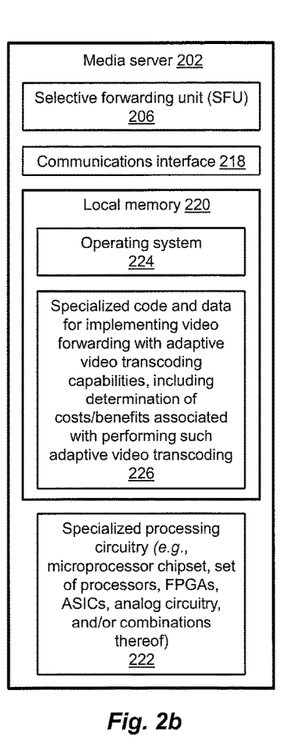
FIG. 2b is a block diagram of the media server of FIG. 2a, in which the media server further includes a local memory having specialized code and data for (i) implementing video forwarding with adaptive video transcoding capabilities, and (ii) determining the costs/benefits associated with such video transcoding.

FIG. 2b depicts a detailed view of the media server 202 of FIG. 2a, in which the media server 202 includes the SFU 206, as well as a communications interface 218, a local memory 220, and specialized processing circuitry 222. The communications interface 218 can be configured to connect the media server 202 to the communications medium 203 (see FIG. 2a), enabling bidirectional communications between the media server 202 and the respective devices 204.1, 204.2, 204.3, . . . , 204.n. The local memory 220 can be configured to include volatile storage (e.g., dynamic random access memory (DRAM), static random access memory (SRAM)), as well as non-volatile storage (e.g., magnetic memory, flash memory). As shown in FIG. 2b, the local memory 220 can be configured to store a variety of software constructs, including an operating system 224 and specialized code and data 226, which can include one or more sets of program instructions that direct the specialized processing circuitry 222 to implement video forwarding with adaptive video transcoding capabilities, including determination of costs/benefits associated with performing such video transcoding. The specialized processing circuitry 222 can be configured to operate in accordance with the specialized code and data 226 stored in the local memory 220. The specialized processing circuitry 222 can be implemented in a variety of ways, using one or more processors running specialized software, one or more application specific integrated circuits (ASICs), one or more field programmable gate arrays (FPGAs), one or more discrete components, digital circuits, analog circuits, and so on, or any suitable combination thereof.

Figure 3:
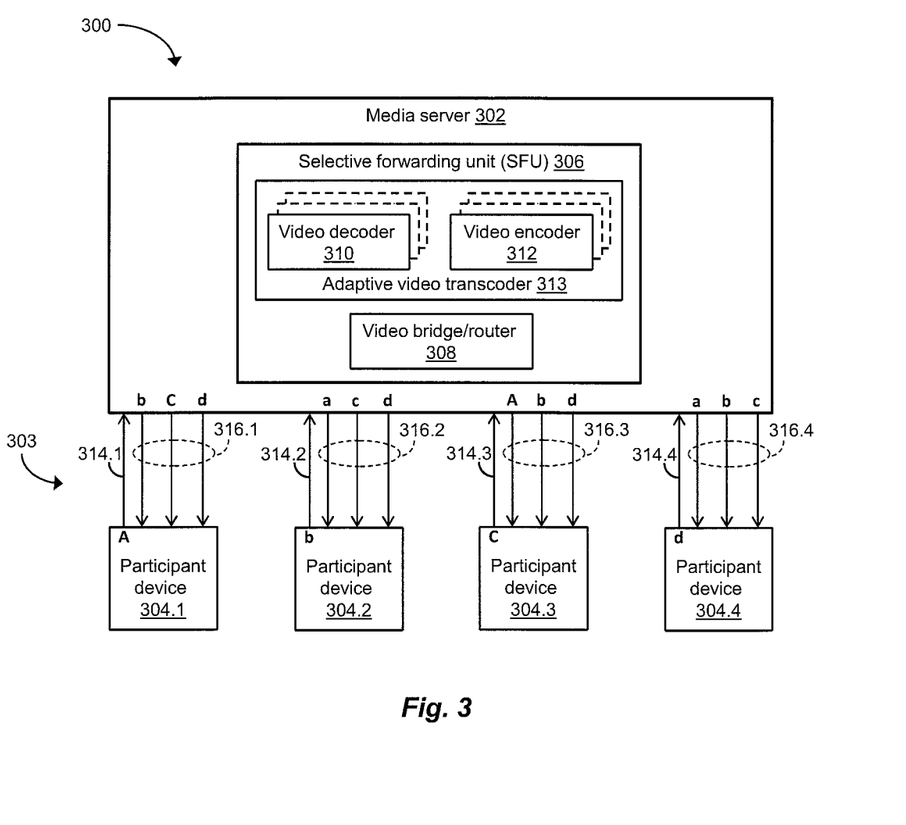
FIG. 3 is a block diagram of an exemplary system including a media server having an SFU with an adaptive video transcoder, for use in describing an illustrative example of providing video forwarding in real-time video applications involving multiple user devices.

The disclosed systems, methods, and techniques for providing video forwarding in real-time video applications involving multiple user devices will be further understood with reference to the following illustrative example, and FIG. 3. As shown in FIG. 3, this example involves an exemplary system 300, which includes a media server 302 and three (3) or more (e.g., four (4)) user (or participant) devices 304.1, 304.2, 304.3, 304.4 communicably coupled to the media server 302 by a communications medium 303, such as one or more wired/wireless networks, paths, or links. With regard to this example, the four (4) participant devices 304.1, . . . , 304.4 can each generate and send, to the media server 302, one or more video streams including RTP video packets. For example, the participant device 304.1 may generate and send a high quality, large video stream (designated by the reference letter "A") to the media server 302 over a communications path 314.1; the participant device 304.2 may generate and send a low quality, small video stream (designated by the reference letter "b") to the media server 302 over a communications path 314.2; the participant device 304.3 may generate and send a high quality, large video stream (designated by the reference letter "C") to the media server 302 over a communications path 314.3; and, the participant device 304.4 may generate and send a low quality, small video stream (designated by the reference letter "d") to the media server 302 over a communications path 314.4. It is noted that, in this example, video streams designated by upper case reference letters (e.g., A, B, C, D) correspond to high quality, large video streams, while video streams designated by lower case reference letters (e.g., a, b, c, d) correspond to low quality, small video streams.

The media server 302 can receive, at a video bridge/router 308 of an SFU 306, the video streams A, b, C, d from the participant devices 304.1, 304.2, 304.3, 304.4, respectively, and selectively forward (or route), via the video bridge/router 308 of the SFU 306, representations of at least some of these video streams to each participant device 304.1, . . . , 304.4. For example, the SFU 306 may selectively forward (or route) (i) a plurality of video streams 316.1 (including representations of the video streams 314.2, 314.3, 314.4) to the participant device 304.1, (ii) a plurality of video streams 316.2 (including representations of the video streams 314.1, 314.3, 314.4) to the participant device 304.2, (iii) a plurality of video streams 316.3 (including representations of the video streams 314.1, 314.2, 314.4) to the participant device 304.3, and (iv) a plurality of video streams 316.4 (including representations of the video streams 314.1, 314.2, 314.3) to the participant device 304.4.

With further regard to this example, each of the participant devices 304.1, 304.3 is assumed to have a high display resolution and/or high available network bandwidth to enable it to receive, via the SFU 306 of the media server 302, three (3) high quality, large video streams originating from the remaining three (3) participant devices, if such high quality, large video streams from the remaining participant devices are available. However, each of the participant devices 304.2, 304.4 is assumed, at least at some times, to have a low display resolution and/or low available network bandwidth, and is therefore incapable at such times of receiving three (3) high quality, large video streams originating from the remaining three (3) participant devices. For this reason, the media server 302 employs the adaptive video transcoder 313 of the SFU 306 to perform video transcoding, as needed, on one or more of the high quality, large video streams A, C originating from the respective devices 304.1, 304.3, respectively, to produce corresponding lower quality, smaller video streams a, c, which can be selectively forwarded by the media server 302 to the participant devices 304.2, 304.4 having the low display resolution and/or low available network bandwidth. For example, the media server 302 may perform such adaptive video transcoding in the event one or more of the participant devices 304.1, 304.2, 304.3, 304.4 (i) have available network bandwidths that are lower than those of the remaining participant devices, (ii) experience packet loss and send one or more real-time control protocol (RTCP) feedback messages (e.g., GNACK feedback messages (retransmission requests), PLI feedback messages (I-frame requests), REMB feedback messages (maximum bandwidth information requests)) to the media server 302, (iii) have video frame sizes that are different from those of the remaining participant devices, and/or (iv) have codec types that are different from those of the remaining participant devices.

In this example, the four (4) participant devices 304.1, 304.2, 304.3, 304.4 (see FIG. 3) initially have available network bandwidths (e.g., 1 Mbits/sec) sufficient to enable them to send high quality, large video streams A, B, C, D, respectively, to the media server 302, and to receive three (3) high quality, large video streams originating from the remaining three (3) participant devices. At a subsequent time, however, the participant device 304.2 experiences a low available network bandwidth (e.g., 500 kbits/sec), preventing it both from sending the high quality, large video stream B to the media server 302, and receiving the three (3) high quality, large video streams A, C, D originating from the participant devices 304.1, 304.3, 304.4, respectively. At this time, the participant device 304.2 sends the low quality, small video stream b to the media server 302. Further, the media server 302 detects the low available network bandwidth from the media server 302 to the participant device 304.2, and sends PLI feedback messages (I-frame requests) to the participant devices 304.1, 304.3, 304.4 to obtain I-frames from the respective devices for use in performing video transcoding on the high quality, large video streams A, C, D. The media server 302 then employs the adaptive video transcoder 313 to perform adaptive video transcoding on (i) the high quality, large video stream A to produce a low quality, small video stream a, (ii) the high quality, large video stream C to produce a low quality, small video stream c, and (iii) the high quality, large video stream D to produce a low quality, small video stream d. Further, the media server 302 selectively forwards (or routes) (i) the plurality of video streams 316.1 including the video streams b, C, D to the participant device 304.1, (ii) the plurality of video streams 316.2 including the video streams a, c, d to the participant device 304.2, (iii) the plurality of video streams 316.3 including the video streams A, b, D to the participant device 304.3, and (iv) the plurality of video streams 316.4 including the video streams A, b, C to the participant device 304.4.

At a further subsequent time, the participant device 304.4 experiences a low available network bandwidth, preventing it both from sending the high quality, large video stream D to the media server 302, and receiving the three (3) high quality, large video streams A, B (if available), D originating from the participant devices 304.1, 304.2, 304.4, respectively. At this time, the participant device 304.4 sends the low quality, small video stream d to the media server 302. Because the media server 302 now receives the low quality, small video stream d from the participant device 304.4, it no longer needs to perform video transcoding to generate the low quality, small video stream d. However, the media server 302 continues to perform adaptive video transcoding on the high quality, large video streams A, C to generate the low quality, small video streams a, c, respectively. The media server 302 then selectively forwards (or routes) (i) the plurality of video streams 316.1 including the video streams b, C, d to the participant device 304.1, (ii) the plurality of video streams 316.2 including the video streams a, c, d to the participant device 304.2, (iii) the plurality of video streams 316.3 including the video streams A, b, d to the participant device 304.3, and (iv) the plurality of video streams 316.4 including the video streams a, b, c to the participant device 304.4.

At a later time, the participant device 304.2 experiences a high available network bandwidth, enabling it to send the high quality, large video stream B to the media server 302, and to receive the three (3) high quality, large video streams A, C, D (if available) originating from the participant devices 304.1, 304.3, 304.4, respectively. Because the media server 302 now receives the high quality, large video stream B from the participant device 304.2, it needs to perform adaptive video transcoding to generate the low quality, small video stream b. The media server 302 therefore sends a PLI feedback message (I-frame request) to the participant device 304.2 to obtain an I-frame from the respective device, and uses the I-frame to start performing video transcoding on the high quality, large video stream B, thereby generating the low quality, small video stream b. The media server 302 then selectively forwards (or routes) (i) the plurality of video streams 316.1 including the video streams B, C, d to the participant device 304.1, (ii) the plurality of video streams 316.2 including the video streams A, C, d to the participant device 304.2, (iii) the plurality of video streams 316.3 including the video streams A, B, d to the participant device 304.3, and (iv) the plurality of video streams 316.4 including the video streams a, b, c to the participant device 304.4.

At a further later time, the participant device 304.4 experiences a high available network bandwidth, enabling it to send the high quality, large video stream D to the media server 302, and to receive the three (3) high quality, large video streams A, B, C originating from the participant devices 304.1, 304.2, 304.3, respectively. Because all of the participant devices 304.1, 304.2, 304.3, 304.4 now have high available network bandwidths, the media server 302 no longer needs to perform video transcoding to generate a low quality, small video stream(s). The media server 302 then selectively forwards (or routes) (i) the plurality of video streams 316.1 including the video streams B, C, D to the participant device 304.1, (ii) the plurality of video streams 316.2 including the video streams A, C, D to the participant device 304.2, (iii) the plurality of video streams 316.3 including the video streams A, B, D to the participant device 304.3, and (iv) the plurality of video streams 316.4 including the video streams A, B, C to the participant device 304.4.

Because the processing overhead due to video transcoding can become large in a real-time video application as the number of participant devices from different network environments increases, the media server 302 can determine costs/benefits associated with performing such video transcoding, and perform adaptive video transcoding, as needed, if the benefits are determined to exceed the costs. To that end, the media server 302 can determine a heterogeneity value associated with the available network bandwidths of the three (3) or more (e.g., four (4)) respective devices 304.1, 304.2, 304.3, 304.4, and a current availability of central processing unit (CPU) and/or memory resources within the media server 302. If the heterogeneity value of the available network bandwidths is greater than a predetermined value (such as zero (0) or any other suitable value) and the CPU and/or memory resources are available, then the media server 302 can employ the adaptive video transcoder 313 to perform video transcoding on at least some of the large video streams A, B, C, D to produce the corresponding small video streams a, b, c, d, respectively, which can be selectively forwarded by the media server 302 to one or more of the participant devices 304.1, . . . , 304.4 having low available network bandwidths.

In this example, the media server 302 can determine the costs/benefits associated with performing video transcoding on one or more high quality large video streams produced by the four (4) or more participant devices 304.1, 304.2, 304.3, 304.4 in a real-time video application, as follows. First, the media server 302 estimates the available network bandwidth "$BW_i$" to each participant device, in which "i" is an index for the $i^{th}$ participant device. In one embodiment, such an available bandwidth can be estimated in accordance with techniques described in U.S. Pat. No. 9,628,411 entitled EFFICIENT PACKET PROCESSING AT VIDEO RECEIVER IN MULTIMEDIA COMMUNICATIONS OVER PACKET NETWORKS issued Apr. 18, 2017. Further, the media server 302 groups the participant devices based on the video stream selectively forwarded by the SFU 306 to the respective devices. In the example of FIG. 3, when the media server 302 receives a video stream from the participant device 304.1 and forwards the video stream to the respective participant devices 304.2, 304.3, 304.4, a group is formed that includes the participant devices 304.2, 304.3, and 304.4. Similarly, when the media server 302 receives a video stream from the participant device 304.2 and forwards the video stream to the respective participant devices 304.1, 304.3, 304.4, another group is formed that includes the participant devices 304.1, 304.3, and 304.4. Accordingly, in this example (which involves the four (4) participant devices 304.1, 304.2, 304.3, 304.4), a total of four (4) such groups can be formed.

The media server 302 then determines a heterogeneity value associated with the available network bandwidths ($BW_i$) of the respective devices in each group. In one embodiment, such a heterogeneity value can be expressed, as follows:

$$\text{Heterogeneity} = \sigma(f(BW_i, B_{goodQaulity})), \quad (1)$$

in which "$BW_i$," corresponds to the available network bandwidth from the media server 302 to the $i^{th}$ participant device, "$B_{goodQaulity}$," corresponds to the minimum bitrate at which a video encoder (i.e., a video encoder 312; see FIG. 3) can generate a high quality video stream at a current frame size (FS), "f( . . . )" is a predetermined function of $BW_i$ and $B_{goodQaulity}$, and "$\sigma$" is the standard deviation operator. The media server 302 also determines a current availability of CPU and/or memory resources within the media server 302. For example, the current availability of the CPU and/or memory resources may be expressed as an available percentage of the respective CPU and/or memory resources within the media server 302.

If the heterogeneity value (see equation (1)) exceeds a predetermined threshold value, and the current availability of the CPU and/or memory resources within the media server 302 also exceeds a predetermined percentage threshold, then the media server 302 determines, calculates, or otherwise obtains the cost associated with performing video transcoding on one or more large video streams produced by one or more participant devices in each group. In one embodiment, such a cost associated with performing video transcoding can be expressed, as follows:

$$\text{Cost} = g(A_{cpu}, A_{mem}, R_{cpu}, R_{mem}), \quad (2)$$

in which "$A_{cpu}$" corresponds to the available CPU resources within the media server 302, "$A_{mem}$" corresponds to the available memory resources within the media server 302, "$R_{cpu}$" corresponds to the CPU resources required for performing video transcoding, "$R_{mem}$" corresponds to the memory resources required for performing video transcoding, and "g( . . . )" is a predetermined function of $A_{cpu}$, $A_{mem}$, $R_{cpu}$, and $R_{mem}$. For example, the predetermined function g( . . . ) may be expressed, as follows:

$$g(A_{cpu}, A_{mem}, R_{cpu}, R_{mem}) = \text{Max}(R_{cpu}/A_{cpu}, R_{mem}/A_{mem})*50. \quad (3)$$

In addition, the media server 302 determines, calculates, or otherwise obtains the benefit associated with performing video transcoding on one or more large video streams produced by one or more participant devices in each group. In one embodiment, such a benefit associated with performing video transcoding can be expressed, as follows:

$$\text{Benefit} = \Sigma_{i=1}^{K} \alpha_i * h(B_{target,withTX}(i), B_{target,withoutTX}(i), FS_{withTX}(i), FS_{withoutTX}(i)), \quad (4)$$

in which "K" corresponds to the number of participant devices in the group, "i" is the index for the $i^{th}$ participant device, "$\alpha_i$" corresponds to the contribution of the $i^{th}$ participant device to the total benefit, "$B_{target,withTx}(i)$" corresponds to a target bitrate of a large video stream after having undergone video transcoding, "$B_{target,withTX}(i)$" corresponds to a target bitrate of the large video stream having not undergone video transcoding, "$B_{target,withoutTX}(i)$" corresponds to a target frame size of the large video stream after having undergone video transcoding, "$FS_{withoutTx}(i)$" corresponds to a target frame size of the large video stream having not undergone video transcoding, and "h( . . . )" is a predetermined function of $B_{target,withTX}(i)$, $B_{target,withoutTX}(i)$, $FS_{withTX}(i)$, and $FS_{withoutTX}(i)$. For example, the contribution $\alpha_i$ may be set to the same value for all participant devices in the group, or be based on specified service levels (e.g., service level 1, 2, or 3) of the respective devices in the group. Further, the predetermined function h( . . . ) may be expressed, as follows:

$$h(i) = \beta*(B_{target,withTX}(i)/B_{target,withoutTX}(i)-1.0)+\gamma* (FS_{withTX}(i)/FS_{withoutTX}(i)-1.0), \quad (5)$$

in which "$\beta$" can be set to 3.0 or any other suitable value, and "$\gamma$" can be set to 0.4 or any other suitable value. It is noted that $B_{targetwithTX}(i)$ is not less than $B_{target,withoutTX}(i)$, and $FS_{withTx}(i)$ is not less then $FS_{withoutTx}(i)$. Accordingly, the predetermined function "h(i)" has a non-negative value.

Next, the media server 302 determines, for each group of participant devices, whether the benefit (see equation (4)) of performing video transcoding exceeds the cost (see equation (2)) of performing video transcoding. If the media server 302 determines that the benefit exceeds the cost, then the media server 302 performs video transcoding on the respective large video stream produced by the respective participant device, in accordance with the adaptive video transcoding techniques described herein. Otherwise, if the media server 302 determines that the cost exceeds the benefit, then the media server 302 avoids performing video transcoding for this group of participant devices. The media server 302 then determines, for each remaining group of participant devices based on the heterogeneity value (see equation (1)) and the current availability of the CPU and/or memory resources, (i) the cost of performing video transcoding (see equation (2)), (ii) the benefit of performing video transcoding (see equation (4)), and (iii) whether or not the benefit exceeds the cost. If the benefit exceeds the cost, then the media server 302 performs video transcoding for the remaining group(s) of participant devices. It is noted that the foregoing technique for determining the costs/benefits associated with performing video transcoding can be performed by the media server 302 periodically (e.g., every 5 seconds). Further, when it is decided to perform video transcoding for one or more groups of participant devices, the order of the groups for which such video transcoding is to be performed can be determined based on the value of the difference between the benefit and the cost (i.e., the net benefit).

Figure 4:
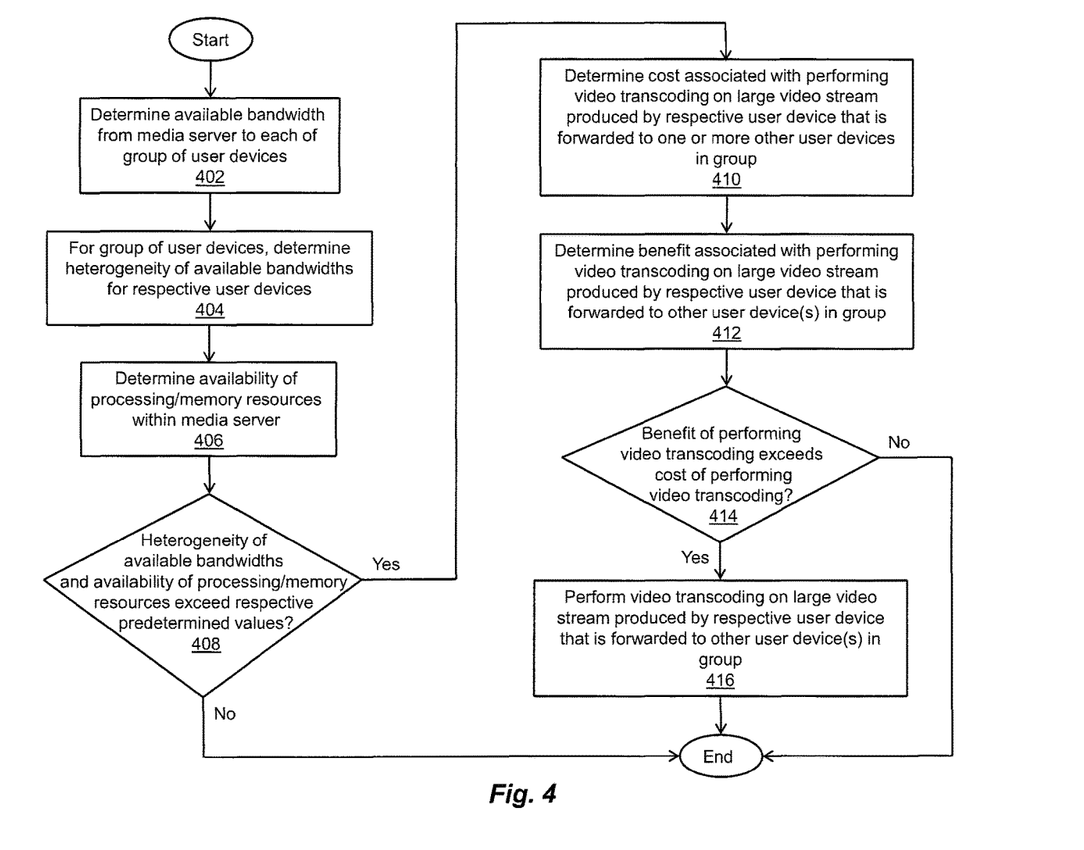
FIG. 4 is a flow diagram of an exemplary method of providing video forwarding in real-time video applications involving multiple user devices.

A method of providing video forwarding in real-time video applications involving multiple user devices is described herein with reference to FIG. 4. As depicted in block 402, an available bandwidth is determined from a media server to each of a group of user devices. As depicted in block 404, for the respective group of user devices, the heterogeneity of available bandwidths is determined for the respective user devices. As depicted in block 406, an availability of processing/memory resources is determined within the media server. As depicted in block 408, a determination is made as to whether the heterogeneity of available bandwidths and the availability of processing/memory resources exceed respective predetermined values. If the heterogeneity of available bandwidths and the availability of processing/memory resources exceed the respective predetermined values, then a cost associated with performing video transcoding on a large video stream produced by a respective user device that is forwarded to one or more other user devices in the group is determined, as depicted in block 410. As depicted in block 412, a benefit associated with performing video transcoding on the large video stream produced by the respective user device that is forwarded to the other user device(s) in the group is determined. As depicted in block 414, a determination is made as to whether the benefit of performing video transcoding exceeds the cost of performing such video transcoding. If the benefit exceeds the cost, then video transcoding is performed on the large video stream produced by the respective user device that is forwarded to the other user device(s) in the group, as depicted in block 416.

Having described the above exemplary embodiments of the disclosed systems, methods, and techniques, other alternative embodiments or variations may be made and/or practiced. For example, it was described herein that, in a system for providing video forwarding in real-time video applications, adaptive video transcoding of high quality, large video streams could be performed to improve user QoE in the presence of heterogeneity in available network bandwidths from a media server to multiple user devices. In certain embodiments, one or more encoders included in an adaptive video transcoder of an SFU may employ frame resolution (frame rate, frame size) adaptation techniques to further improve user QoE.

In certain further embodiments, one or more user devices in a system for providing video forwarding in real-time video applications can send simultaneous broadcast (or simulcast) video streams including at least a high quality, large video stream and a low quality, small video stream to a media server. For example, in a system including "M" (M>1) user devices, "N" (0<N≤M) user devices may each send both a large video stream and a small video stream to the media server. Further, each of the M user devices may receive one (1) large video stream and N−1 small video streams from the media server. In this alternative embodiment, the media server can dynamically select a large video stream among the simulcast video streams for performing video transcoding, in the event a lower quality, smaller video representation of the large video stream needs to be displayed on a user device associated with a low available bandwidth from the media server.

It is noted that the operations herein described are purely exemplary and imply no particular order. Further, the operations can be used in any sequence when appropriate and can be partially used. With the above illustrative embodiments in mind, it should be understood that the above-described systems, methods, and techniques might employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and/or otherwise manipulated.

Moreover, any of the operations described herein that form part of the above-described systems, methods, and techniques are useful machine operations. The above-described systems, methods, and techniques also relate to a device or an apparatus for performing such operations. The apparatus can be specially constructed for the required purpose, or the apparatus can be a general-purpose computer selectively activated or configured by a software program stored in the computer. In particular, various general-purpose machines employing one or more processors coupled to one or more computer readable media can be used with software programs written in accordance with the teachings herein, or it may be more convenient to construct a more specialized apparatus to perform the required operations.

The above-described systems, methods, and techniques can also be embodied as computer readable code on a computer readable medium. The computer readable medium is any data storage device that can store data, which can thereafter be read by a computer system. Examples of such computer readable media include hard drives, read-only memory (ROM), random-access memory (RAM), CD-ROMs, CD-Rs, CD-RWs, magnetic tapes, and other optical and non-optical data storage devices. The computer readable media can also be distributed over a network-coupled computer system so that the computer readable code is stored and executed in a distributed fashion.

While various embodiments of the invention have been particularly shown and described, it will be understood by those skilled in the art that various changes in form and details may be made therein without departing from the scope of the invention as defined by the appended claims.

What is claimed is:

1. A selective forwarding unit (SFU), comprising: a real-time adaptive video transcoder;
a memory storing one or more sets of instructions; and
at least one processor configured to execute the one or more sets of instructions:
  to receive at least a first large video stream and a second large video stream from a first user device and a second user device, respectively to identify the first user device as being associated with a low available bandwidth;
  to cause the real-time adaptive video transcoder to perform, in real-time, adaptive video transcoding on the second large video stream received from the second user device to produce a small video stream that conforms to the low available bandwidth associated with the first user device; and
  to selectively forward the small video stream to the first user device associated with the low available bandwidth;
wherein the at least one processor is further configured to execute the one or more sets of instructions to determine at least a first available bandwidth from the SFU to the first user device and a second available bandwidth from the SFU to the second user device; and
wherein the at least one processor is further configured to execute the one or more sets of instructions to determine a heterogeneity value associated with at least the first available bandwidth and the second available bandwidth associated with the first user device and the second user device, respectively.

2. The SFU of claim 1 wherein the real-time adaptive video transcoder includes at least one encoder, and wherein the heterogeneity value is based on (i) the first available bandwidth and the second available bandwidth associated with the first user device and the second user device, respectively, and (ii) a minimum bitrate at which the at least one video encoder can generate a high quality, large video stream at a predetermined frame size.

3. The SFU of claim 1 wherein the at least one processor is further configured to execute the one or more sets of instructions to determine an availability of processing/memory resources within the SFU.

4. The SFU of claim 3 wherein the at least one processor is further configured to execute the one or more sets of instructions to determine whether the heterogeneity value and the availability of processing/memory resources exceed a first predetermined threshold and a second predetermined threshold, respectively.

5. The SFU of claim 4 wherein the at least one processor is further configured to execute the one or more sets of instructions, in the event the heterogeneity value and the availability of processing/memory resources exceed the first predetermined threshold and the second predetermined threshold, respectively, to determine a cost associated with performing real-time adaptive video transcoding on at least the second large video stream received at the SFU.

6. The SFU of claim 5 wherein the at least one processor is further configured to execute the one or more sets of instructions, in the event the heterogeneity value and the availability of processing/memory resources exceed the first predetermined threshold and the second predetermined threshold, respectively, to determine a benefit associated with performing real-time adaptive video transcoding on at least the second large video stream received at the SFU.

7. The SFU of claim 6 wherein the at least one processor is further configured to execute the one or more sets of instructions to determine whether the benefit associated with performing real-time adaptive video transcoding exceeds the cost associated with performing real-time adaptive video transcoding.

8. The SFU of claim 7 wherein the at least one processor is further configured to execute the one or more sets of instructions, in the event the benefit exceeds the cost, to cause the real-time adaptive video transcoder included in the SFU to perform, in real-time, adaptive video transcoding on the second large video stream received at the SFU from the second user device to produce the small video stream that conforms to the low available bandwidth associated with the first user device.

9. The SFU of claim 1 wherein the at least one processor is further configured to execute the one or more sets of instructions:
 to receive a small video stream from the first user device while no longer receiving the first large video stream from the first user device; and
 to selectively forward the small video stream received from the first user device to the second user device.

10. The SFU of claim 1 wherein the low available bandwidth corresponds to a low available bandwidth from the SFU to the first user device, and wherein the at least one processor is further configured to execute the one or more sets of instructions:
 having received the first large video stream from the first user device, to selectively forward the small video stream produced by adaptive video transcoding to the first user device.

11. A method of providing real-time adaptive video transcoding in a selective forwarding unit (SFU), comprising:

receiving at least a first large video stream and a second large video stream from a first user device and a second user device, respectively, identifying the first user device being associated with a low available bandwidth;
performing, in real-time, adaptive video transcoding on the second large video stream received from the second user device received from the second user device to produce a small video stream that conforms to the low available bandwidth associated with the first user device;
selectively forwarding the small video stream to the first user device associated with the low available bandwidth; and
determining a heterogeneity value associated with at least a first available bandwidth and a second available bandwidth associated with the first user device and the second user device, respectively.

12. The method of claim 11 further comprising:
determining an availability of processing/memory resources within the SFU; and
determining whether the heterogeneity value and the availability of processing/memory resources exceed a first predetermined threshold and a second predetermined threshold, respectively.

13. The method of claim 12 further comprising: in
the event the heterogeneity value and the availability of processing/memory resources exceed the first predetermined threshold and the second predetermined threshold, respectively, determining a cost associated with performing real-time adaptive video transcoding on the second large video stream received at the SFU from the second user device.

14. The method of claim 13 further comprising: in
the event the heterogeneity value and the availability of processing/memory resources exceed the first predetermined threshold and the second predetermined threshold, respectively, determining a benefit associated with performing real-time adaptive video transcoding on the second large video stream received at the SFU from the second user device.

15. The method of claim 14 further comprising:
in the event the benefit exceeds the cost, performing, in real-time, adaptive video transcoding on the second large video stream received at the SFU from the second user device to produce the small video stream that conforms to the low available bandwidth associated with the first user device.

16. A selective forwarding unit (SFU), comprising: a
real-time adaptive video transcoder;
a memory storing one or more sets of instructions; and
at least one processor configured to execute the one or more sets of instructions:
 to receive at least a first large frame format video stream and a second large frame format video stream from a first user device and a second user device, respectively, to identify the first user device as having a low display resolution;
 to cause the real-time adaptive video transcoder to perform, in real-time, frame resolution adaptation on the second large frame format video stream to transform the second large frame format video stream to a reduced frame format video stream that conforms to the low display resolution of the first user device; and to selectively forward the reduced frame format video stream to the first user device having the low display resolution;

wherein the at least one processor is further configured to execute the one or more sets of instructions to determine at least a first available bandwidth from the SFU to the first user device and a second available bandwidth from the SFU to the second user device; and wherein the at least one processor is further configured to execute the one or more sets of instructions to determine a heterogeneity value associated with at least the first available bandwidth and the second available bandwidth associated with the first user device and the second user device, respectively.

17. A method of providing real-time adaptive video transcoding in a selective forwarding unit (SFU), comprising:

receiving at least a first large frame format video stream and a second large frame format video stream from a first user device and a second user device, respectively;

identifying the first user device as having a low display resolution;

performing, in real-time, frame resolution adaptation on the second large frame format video stream to transform the second large frame format video stream to a reduced frame format video stream that conforms to the low display resolution of the first user device;

selectively forwarding the reduced frame format video stream to the first user device having the low display resolution;

determining at least a first available bandwidth from the SFU to the first user device and a second available bandwidth from the SFU to the second user device; and determining a heterogeneity value associated with at least the first available bandwidth and the second available bandwidth associated with the first user device and the second user device, respectively.

* * * * *

UNITED STATES PATENT AND TRADEMARK OFFICE
CERTIFICATE OF CORRECTION

PATENT NO. : 11,032,587 B2
APPLICATION NO. : 16/272184
DATED : June 8, 2021
INVENTOR(S) : Kyeong Ho Yang and Antony R. Martin Page 1 of 1

It is certified that error appears in the above-identified patent and that said Letters Patent is hereby corrected as shown below:

In the Specification

Column 12, Line 13, delete "undergone video transcoding, "$B_{target,withTX}(i)$"", insert --undergone video transcoding, "$B_{target,without}TX(i)$"--

Column 12, Line 15, delete "undergone video transcoding, "$B_{target,without}TX(i)$"", insert --undergone video transcoding, "$FS_{withTX}(i)$"--

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*